US010315658B2

(12) United States Patent
Moriya et al.

(10) Patent No.: US 10,315,658 B2
(45) Date of Patent: Jun. 11, 2019

(54) VEHICLE DRIVING FORCE CONTROL APPARATUS

(71) Applicant: SUBARU CORPORATION, Tokyo (JP)

(72) Inventors: Fumiyuki Moriya, Tokyo (JP); Hiroshi Ienaga, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 16 days.

(21) Appl. No.: 15/635,311

(22) Filed: Jun. 28, 2017

(65) Prior Publication Data
US 2018/0079415 A1 Mar. 22, 2018

(30) Foreign Application Priority Data

Sep. 21, 2016 (JP) .................................. 2016-183874

(51) Int. Cl.
B60W 30/188 (2012.01)
B60W 30/02 (2012.01)
(Continued)

(52) U.S. Cl.
CPC ............. B60W 30/188 (2013.01); B60L 3/10 (2013.01); B60L 3/12 (2013.01); B60L 15/2036 (2013.01);
(Continued)

(58) Field of Classification Search
CPC .. B60W 30/188; B60W 30/02; B60W 10/119; B60W 10/08; B60W 10/10;
(Continued)

(56) References Cited

U.S. PATENT DOCUMENTS 6,427,104 B1 * 7/2002 Matsushita .......... B62D 5/0463
701/41
7,007,763 B2 * 3/2006 Ginther .................. B60K 23/04
180/6.2
(Continued)

FOREIGN PATENT DOCUMENTS

JP 2005151691 A 6/2005
JP 2006-143149 A 6/2006
(Continued)

OTHER PUBLICATIONS

Office Action for JP Patent Application No. 2016-183874, dated Mar. 13, 2018, 05 pages of Office Action and 06 pages of English Translation.

Primary Examiner — Jacob S. Scott
Assistant Examiner — Tinh T Dang
(74) Attorney, Agent, or Firm — Chip Law Group

(57) ABSTRACT

A vehicle driving force control apparatus is mounted in a vehicle that runs by transmitting power from a plurality of drive sources to a plurality of wheels or a plurality of sets of wheels. The vehicle driving force control apparatus includes: a ratio determination unit; and a command unit. The ratio determination unit determines a target ratio at which a required driving force applied to the vehicle is to be distributed to the plurality of wheels or the plurality of sets of wheels. The command unit commands the plurality of drive sources to output power such that driving force distributed in accordance with the target ratio is generated in the plurality of wheels or the plurality of sets of wheels.

7 Claims, 12 Drawing Sheets

(51) Int. Cl.
  *B60W 10/119* (2012.01)
  *B60W 10/08* (2006.01)
  *B60W 10/10* (2012.01)
  *B60W 30/18* (2012.01)
  *B60L 3/10* (2006.01)
  *B60L 3/12* (2006.01)
  *B60L 15/20* (2006.01)
  *B60W 50/00* (2006.01)
  *B60W 20/10* (2016.01)

(52) U.S. Cl.
  CPC ............ *B60W 10/08* (2013.01); *B60W 10/10* (2013.01); *B60W 10/119* (2013.01); *B60W 20/10* (2013.01); *B60W 30/02* (2013.01); *B60W 30/18145* (2013.01); *B60L 2240/22* (2013.01); *B60L 2240/24* (2013.01); *B60L 2240/425* (2013.01); *B60L 2240/461* (2013.01); *B60L 2250/26* (2013.01); *B60W 2050/0026* (2013.01); *B60W 2510/20* (2013.01); *B60W 2510/207* (2013.01); *B60W 2510/244* (2013.01); *B60W 2520/14* (2013.01); *B60W 2520/26* (2013.01); *B60W 2520/266* (2013.01); *B60W 2520/28* (2013.01); *B60W 2720/403* (2013.01); *Y02T 10/7275* (2013.01)

(58) Field of Classification Search
  CPC ....... B60W 30/18145; B60W 2510/20; B60W 2510/207; B60W 2520/14; B60W 2050/0026; B60L 3/10; B60L 3/12; B60L 15/2036; Y02T 10/7275
  See application file for complete search history.

(56) References Cited

U.S. PATENT DOCUMENTS

| | | | |
|---|---|---|---|
| 9,776,527 B2* | 10/2017 | Sponheimer | B60L 15/2036 |
| 2009/0088914 A1 | 4/2009 | Mizutani et al. | |
| 2009/0102145 A1* | 4/2009 | Moriki | B60K 6/44 |
| | | | 280/5.507 |
| 2014/0238766 A1 | 8/2014 | Hasuda et al. | |
| 2014/0343770 A1* | 11/2014 | Sponheimer | B60L 15/2036 |
| | | | 701/22 |
| 2016/0362102 A1* | 12/2016 | Honda | B60K 1/02 |

FOREIGN PATENT DOCUMENTS

| | | |
|---|---|---|
| JP | 2007-313982 A | 12/2007 |
| JP | 2009-143292 A | 7/2009 |
| JP | 2009159682 A | 7/2009 |
| JP | 2011-063132 A | 3/2011 |
| JP | 4765552 B2 | 9/2011 |
| JP | 2012-187984 A | 10/2012 |
| JP | 2014-166069 A | 9/2014 |
| JP | 2014-212614 A | 11/2014 |
| JP | 2014217204 A | 11/2014 |
| JP | 2015136980 A | 7/2015 |

* cited by examiner

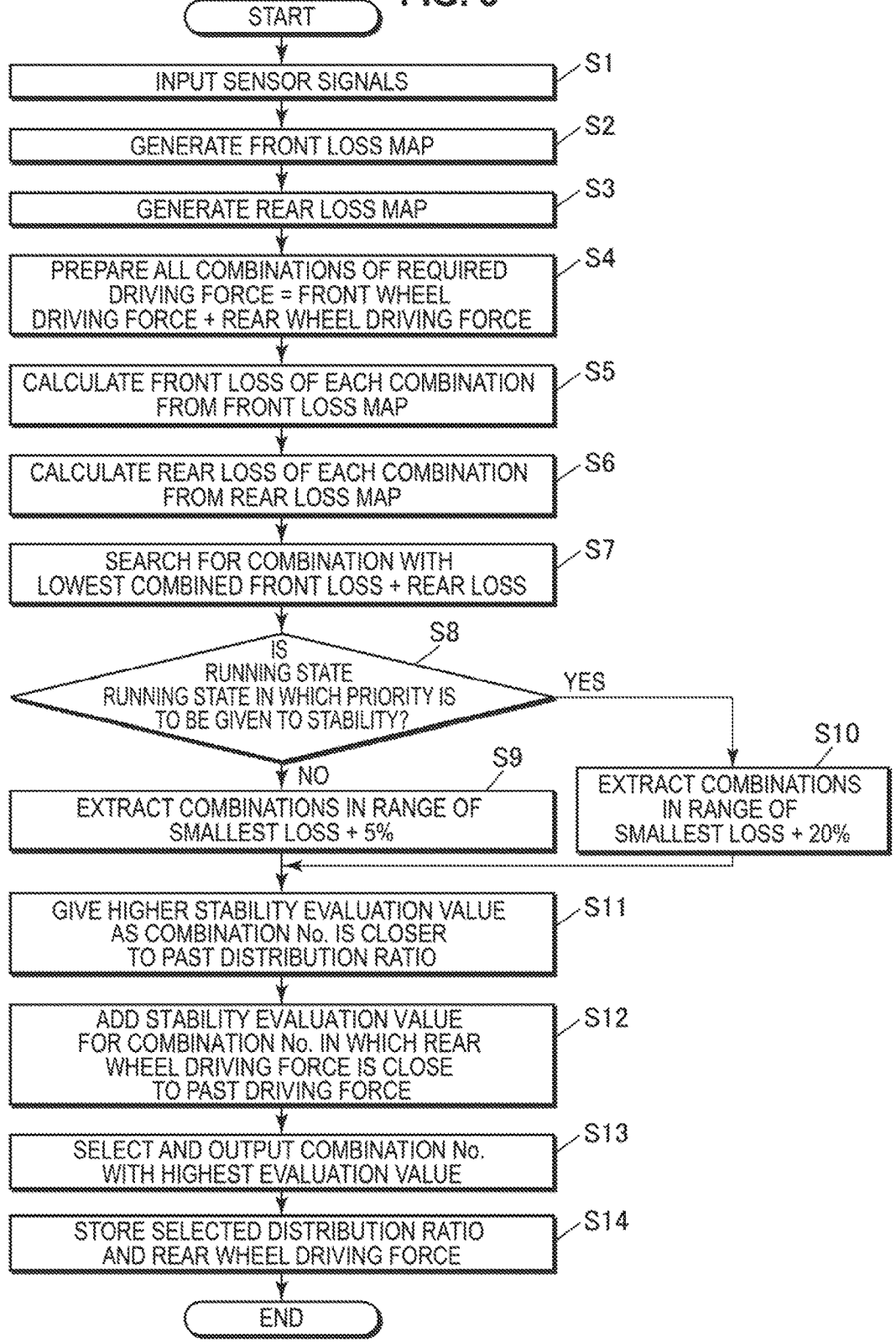

FIG. 4A

| | | COMBINATION No. | | | | | | | | | | |
|---|---|---|---|---|---|---|---|---|---|---|---|---|
| | | 1 | 2 | 3 | 4 | 5 | 6 | 7 | 8 | 9 | 10 | 11 |
| FRONT WHEELS | DRIVING FORCE [N] | 140 | 120 | 100 | 80 | 60 | 50 | 40 | 20 | 0 | -20 | -40 |
| | LOSS [W] | | | | | | | | | | | |
| REAR WHEELS | DRIVING FORCE [N] | -40 | -20 | 0 | 20 | 40 | 50 | 60 | 80 | 100 | 120 | 140 |
| | LOSS [W] | | | | | | | | | | | |
| TOTAL | LOSS [W] | | | | | | | | | | | |

FIG. 4B

|  |  | COMBINATION No. | | | | | | | | | | |
|---|---|---|---|---|---|---|---|---|---|---|---|
|  |  | 1 | 2 | 3 | 4 | 5 | 6 | 7 | 8 | 9 | 10 | 11 |
| FRONT WHEELS | DRIVING FORCE [N] | 140 | 120 | 100 | 80 | 60 | 50 | 40 | 20 | 0 | -20 | -40 |
|  | LOSS [W] | 5200 | 3700 | 2800 | 2100 | 1450 | 1200 | 900 | 400 | 50 | 400 | 900 |
| REAR WHEELS | DRIVING FORCE [N] | -40 | -20 | 0 | 20 | 40 | 50 | 60 | 80 | 100 | 120 | 140 |
|  | LOSS [W] | 600 | 300 | 20 | 300 | 600 | 900 | 1300 | 2000 | 2800 | 4100 | 6000 |
| TOTAL | LOSS [W] | 5800 | 4000 | 2820 | 2400 | 2050 | 2100 | 2200 | 2400 | 2850 | 4500 | 6900 |

| | | COMBINATION No. | | | | | | | | | | |
|---|---|---|---|---|---|---|---|---|---|---|---|---|
| | | 1 | 2 | 3 | 4 | 5 | 6 | 7 | 8 | 9 | 10 | 11 |
| FRONT WHEELS | DRIVING FORCE [N] | 140 | 120 | 100 | 80 | 60 | 50 | 40 | 20 | 0 | −20 | −40 |
| | LOSS [W] | 5200 | 3700 | 2800 | 2100 | 1450 | 1200 | 900 | 400 | 50 | 400 | 900 |
| REAR WHEELS | DRIVING FORCE [N] | −40 | −20 | 0 | 20 | 40 | 50 | 60 | 80 | 100 | 120 | 140 |
| | LOSS [W] | 600 | 300 | 20 | 300 | 600 | 900 | 1300 | 2000 | 2800 | 4100 | 6000 |
| TOTAL | LOSS [W] | 5800 | 4000 | 2820 | 2400 | 2050 | 2100 | 2200 | 2400 | 2850 | 4500 | 6900 |

FIG. 4D

| | | COMBINATION No. | | | | | | | | | | |
|---|---|---|---|---|---|---|---|---|---|---|---|---|
| | | 1 | 2 | 3 | 4 | 5 | 6 | 7 | 8 | 9 | 10 | 11 |
| FRONT WHEELS | DRIVING FORCE [N] | 140 | 120 | 100 | 80 | 60 | 50 | 40 | 20 | 0 | -20 | -40 |
| | LOSS [W] | 5200 | 3700 | 2800 | 2100 | 1450 | 1200 | 900 | 400 | 50 | 400 | 900 |
| REAR WHEELS | DRIVING FORCE [N] | -40 | -20 | 0 | 20 | 40 | 50 | 60 | 80 | 100 | 120 | 140 |
| | LOSS [W] | 600 | 300 | 20 | 300 | 600 | 900 | 1300 | 2000 | 2800 | 4100 | 6000 |
| TOTAL | LOSS [W] | 5800 | 4000 | 2820 | 2400 | 2050 | 2100 | 2200 | 2400 | 2850 | 4500 | 6900 |

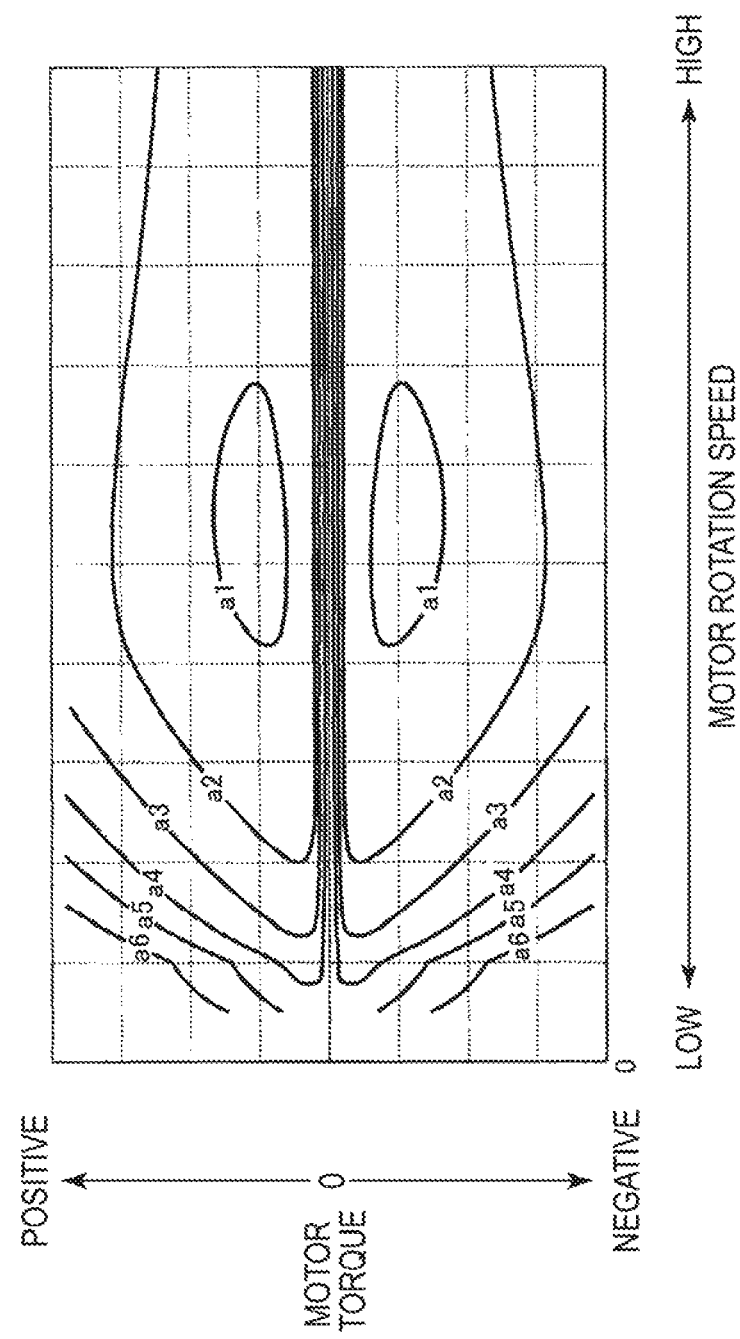

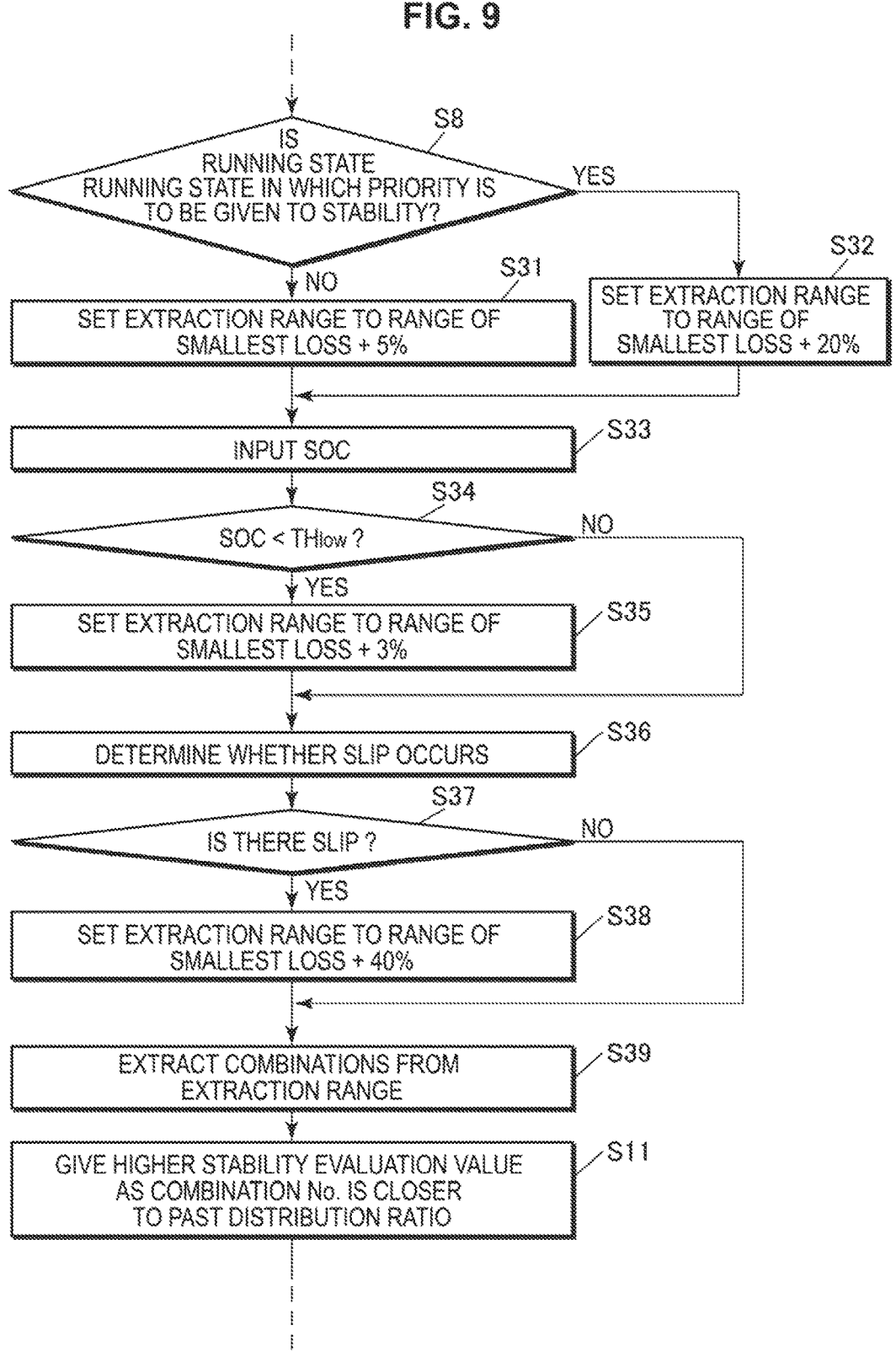

VEHICLE DRIVING FORCE CONTROL APPARATUS

CROSS-REFERENCE TO RELATED APPLICATIONS

The present application claims priority from Japanese Patent Application No. 2016-183874 filed on Sep. 21, 2016, the entire contents of which are hereby incorporated by reference.

BACKGROUND

1. Technical Field

The present invention relates to a driving force control apparatus for a vehicle having a plurality of drive sources.

2. Related Art

Conventionally, in the field of electric vehicles or hybrid electric vehicles, vehicles that run by transmitting power from a plurality of drive sources to a plurality of wheels have been proposed. In such a vehicle, when required driving force or required torque is applied to the vehicle in response to a driving operation, there is a degree of freedom as to how power is distributed among the plurality of drive sources to obtain such driving force.

Japanese Unexamined Patent Application Publication (JP-A) No. 2015-136980, JP-A No. 2005-151691, JP-A No. 2014-217204, Japanese Patent No. 4765552, and JP-A No. 2009-159682 describe technologies that determine how to distribute the required driving force or required torque among a plurality of running motors. With the technologies described in JP-A No. 2015-136980, JP-A No. 2005-151691, JP-A No. 2014-217204, and Japanese Patent No. 4765552, the required torque or required driving force is distributed in a manner such that the overall energy efficiency increases. With the technology described in JP-A No. 2009-159682, the required torque is distributed taking into account driving stability and energy efficiency.

In a vehicle that runs by transmitting power from a plurality of drive sources to a plurality of wheels, driving stability changes depending on the ratio of driving force distributed to the plurality of wheels. Also, energy loss in drive sources and power transmission mechanisms differs depending on rotation speed and torque. Therefore, in such a vehicle, the driving force is preferably distributed among the plurality of wheels in a manner that improves both driving stability and energy efficiency.

The technology according to JP-A No. 2009-159682 aims to both improve energy efficiency of a plurality of drive sources, and improve driving stability. However, it is thought that the ideal driving force distribution that improves both energy efficiency and driving stability is not obtained with the technology described in JP-A No. 2009-159682.

For instance, with the driving force control apparatus described in JP-A No. 2009-159682, the required torque is distributed at a first distribution ratio that improves energy efficiency if driving is stable, and is distributed at a second distribution ratio that improves driving stability if driving is unstable (see paragraph and FIGS. 4A, 4B, 4C and 4D in JP-A No. 2009-159682). However, with such control, hunting occurs in which the distribution ratio switches back and forth between the first distribution ratio and the second distribution ratio (see FIGS. 4A, 4B, 4C and 4D in JP-A No. 2009-159682). When hunting occurs, the time that it takes for the distribution ratio of the required torque to transition between the first distribution ratio and the second distribution ratio increases, and as a result, energy efficiency and driving stability decrease.

Also, JP-A No. 2009-159682 also describes balance distribution control in which the driving force control apparatus distributes the required torque at an intermediate value between the first distribution ratio that improves energy efficiency and the second distribution ratio that improves driving stability (see paragraph and FIG. 8 in JP-A No. 2009-159682). However, energy efficiency does not change monotonically with a change in the distribution ratio of the required torque. Therefore, a balance between energy efficiency and driving stability is not achieved even when the distribution ratio is controlled to this intermediate value. In actuality, changing the distribution ratio of the required torque from the intermediate value to one of the first distribution ratio and the second distribution ratio often results in an improvement in both energy efficiency and driving stability.

Also, even when attempting to achieve both energy efficiency and driving stability, the inventors of the present invention thought it preferable to be able to select which of energy efficiency and driving stability to prioritize, and adjust the degree to which it is prioritized, in accordance with the running state. However, with the driving force control apparatus described in JP-A No. 2009-159682, priority is simply switched between energy efficiency and driving stability, depending on whether the same running state has continued for a certain period of time. Therefore, the degree of priority is not adjusted in accordance with various parameters indicative of the running state.

SUMMARY OF THE INVENTION

It is desirable to provide a vehicle driving force control apparatus capable of distributing driving force in a manner such that both energy efficiency and driving stability are improved at the same time, in a vehicle that runs by transmitting power from a plurality of drive sources to a plurality of wheels.

An aspect of the present invention provides a vehicle driving force control apparatus mounted in a vehicle that runs by transmitting power from a plurality of drive sources to a plurality of wheels or a plurality of sets of wheels, the vehicle driving force control apparatus including: a ratio determination unit configured to determine a target ratio at which a required driving force applied to the vehicle is to be distributed to the plurality of wheels or the plurality of sets of wheels; and a command unit configured to command the plurality of drive sources to output power such that driving force distributed in accordance with the target ratio is generated in the plurality of wheels or the plurality of sets of wheels. The ratio determination unit includes a candidate extracting module configured to extract a plurality of candidate ratios with running low energy loss from among ratios at which the required driving force is to be distributed, and a ratio selecting module configured to select one candidate ratio with a high driving stability from among the plurality of candidate ratios, and the distribution ratio selected by the ratio selecting module is made the target ratio.

The vehicle driving force control apparatus may further include: a plurality of power transmission mechanisms configured to transmit power from the plurality of drive sources to the plurality of wheels or the plurality of sets of wheels. The candidate extracting module may extract the plurality of candidate ratios on the basis of the running energy loss including energy loss generated in the plurality of drive sources, and energy loss generated in the plurality of power transmission mechanisms.

The candidate extracting module may change a width of a ratio range from which the plurality of candidate ratios are extracted, on the basis of a running state of the vehicle.

The ratio selecting module may select the one candidate ratio on the basis of a target ratio determined in a past.

The plurality of wheels or the plurality of sets of wheels may include front wheels and rear wheels. The ratio selecting module may select the one candidate ratio on the basis of a driving force distributed in a past to a first set of wheels that is either one of the front wheels and the rear wheels.

The vehicle driving force control apparatus may further include: a steering angle sensor configured to detect a steering angle of the vehicle; a wheel speed sensor configured to detect a wheel speed of the vehicle; and a yaw rate sensor configured to detect an actual yaw rate of the vehicle. The plurality of wheels or the plurality of sets of wheels may include front wheels and rear wheels. The ratio determination unit may include a first correcting module configured to decrease-correct a distribution ratio of the front wheels from a candidate ratio selected by the ratio selecting module, when detection results from the steering angle sensor, the wheel speed sensor, and the yaw rate sensor indicate understeer. The corrected distribution ratio may be made the target ratio.

The vehicle driving force control apparatus may further include: a steering angle sensor configured to detect a steering angle of the vehicle; a wheel speed sensor configured to detect a wheel speed of the vehicle; and a yaw rate sensor configured to detect an actual yaw rate of the vehicle. The plurality of wheels or the plurality of sets of wheels may include front wheels and rear wheels. The ratio determination unit may include a second correcting module configured to increase-correct a distribution ratio of the front wheels from a candidate ratio selected by the ratio selecting module, when detection results from the steering angle sensor, the wheel speed sensor, and the yaw rate sensor indicate oversteer. The corrected distribution ratio may be made the target ratio.

The vehicle driving force control apparatus may further include: a slip determination unit configured to determine whether the plurality of wheels or the plurality of sets of wheels slip. The candidate extracting module may make a ratio range from which the plurality of candidate ratios are extracted wider when the slip determination unit determines that a slip occurs than when the slip determination unit does not determine that a slip occurs.

Each of the plurality of drive sources may be a motor configured to be driven by an electric power from a battery. The candidate extracting module may make a ratio range from which the plurality of candidate ratios are extracted narrower when a charging rate of the battery is lower than a threshold than when the charging rate of the battery is higher than the threshold.

The vehicle driving force control apparatus may further include: a slip determination unit configured to determine whether the plurality of wheels or the plurality of sets of wheels slip. Each of the plurality of drive sources may be a motor configured to be driven by an electric power from a battery. The candidate extracting module may change a width of a ratio range from which the plurality of candidate ratios are extracted, on the basis of whether a charging rate of the battery is lower than a threshold, when the slip determination unit does not determine that a slip occurs. The candidate extracting module may make the ratio range from which the plurality of candidate ratios are extracted wider when the slip determination unit determines that a slip occurs than when the slip determination unit does not determine that a slip occurs, regardless of whether the charging rate of the battery is lower than the threshold.

BRIEF DESCRIPTION OF THE DRAWINGS

FIG. 3 is a flowchart illustrating an instance of steps in a driving force distribution process in the first example executed by the ECU;

FIG. 4A is an explanatory view illustrating a first stage in the flow of the driving force distribution process;

FIG. 4B is an explanatory view illustrating a second stage in the flow of the driving force distribution process;

FIG. 4C is an explanatory view illustrating a third stage in the flow of the driving force distribution process;

FIG. 4D is an explanatory view illustrating a fourth stage in the flow of the driving force distribution process;

FIG. 5 is a graph illustrating an instance of a front loss map;

FIG. 9 is a flowchart illustrating an instance of steps in a driving force distribution process in the third example executed by the ECU.

DETAILED DESCRIPTION

Figure 1:
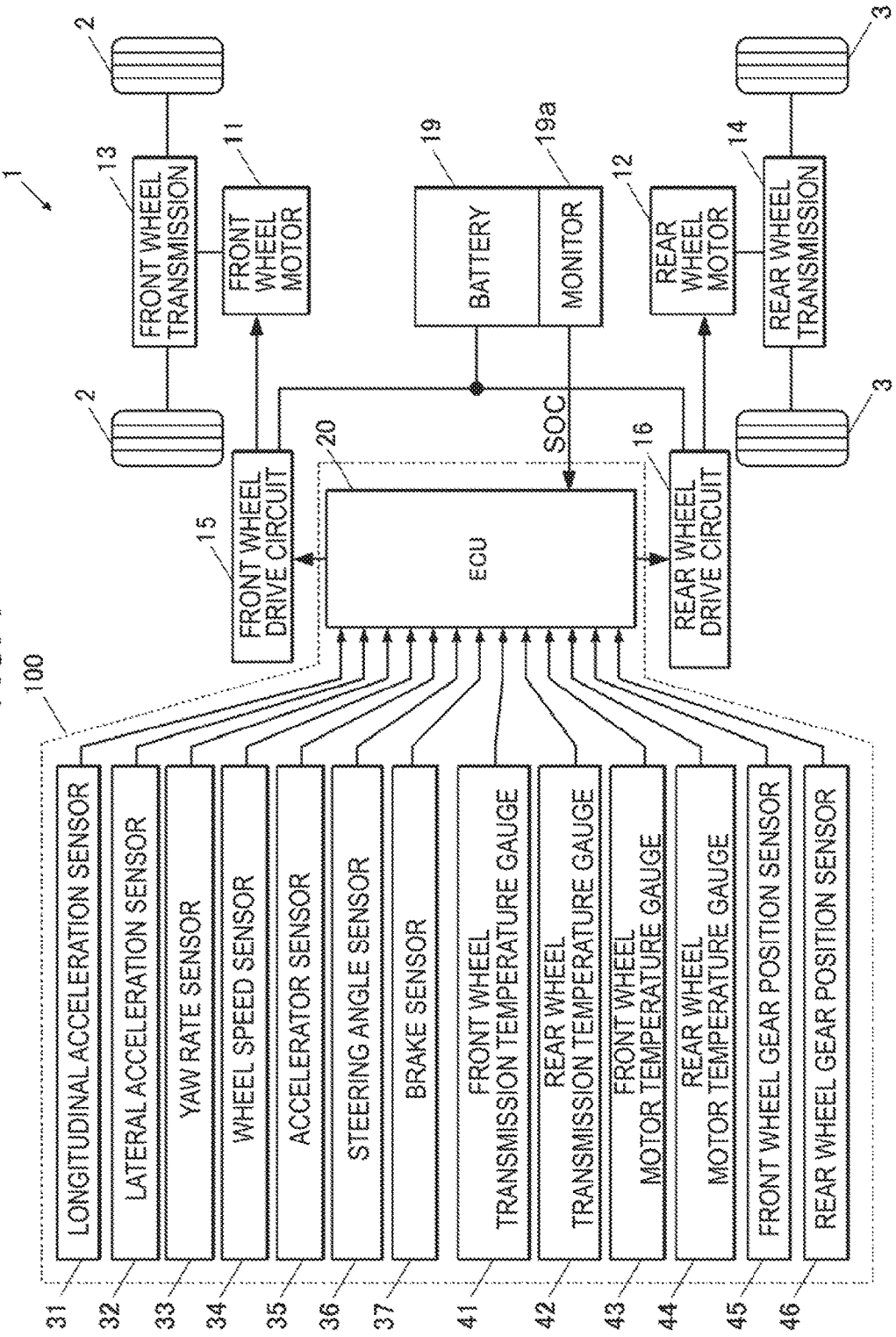
FIG. 1 is a block diagram illustrating a vehicle according to an example of the present invention.

Hereinafter, preferred examples of the present invention will be described in detail with reference to the appended drawings. Note that, in this specification and the appended drawings, structural elements that have substantially the same function and structure are denoted with the same reference numerals, and repeated description of these structural elements is omitted.

Hereinafter, each example of the present invention will be described in detail with reference to the accompanying drawings. FIG. 1 is a block diagram illustrating a vehicle according to the example of the present invention.

First Example

A vehicle 1 according to the example of the present invention is an electric vehicle (EV), for instance, and has left and right front wheels 2, left and right rear wheels 3, a front wheel motor 11, a rear wheel motor 12, a front wheel transmission 13, and a rear wheel transmission 14. The vehicle 1 also has a front wheel drive circuit 15, a rear wheel drive circuit 16, a battery 19, a monitor 19a of the battery 19, an electronic control unit (ECU) 20, and a group of sensors (31 to 37 and 41 to 46). Of these, in one example of the invention, the front wheel motor 11 and the rear wheel motor 12 may serve as a plurality of drive sources. In one example of the invention, the front wheel transmission 13 and the rear wheel transmission 14 may serve as a plurality of power transmission mechanisms. In one example of the invention, the left and right front wheels 2 and the left and right rear wheels 3 may serve as a plurality of sets of wheels.

A driving force control apparatus 100 of the vehicle 1 according to an example of the present invention is mounted in the vehicle 1 and controls the driving force of the front wheels 2 and the driving force of the rear wheels 3. In one example of the invention, the driving force control apparatus 100 may serve as a portion that includes the ECU 20 and the group of sensors (31 to 37 and 41 to 46), of the structures described above.

The front wheel drive circuit 15 converts electric power from the battery 19 and outputs the converted electric power to the front wheel motor 11 in accordance with a command from the ECU 20. The front wheel motor 11 generates power on the basis of this electric power. The front wheel transmission 13 transmits the power from the front wheel motor 11 to the front wheels 2. As a result, driving force is generated in the left and right front wheels 2.

Similarly, the rear wheel drive circuit 16 converts electric power from the battery 19 and outputs the converted electric power to the rear wheel motor 12 in accordance with a command from the ECU 20. The rear wheel motor 12 generates power on the basis of this electric power. The rear wheel transmission 14 transmits the power from the rear wheel motor 12 to the rear wheels 3. As a result, driving force is generated in the left and right rear wheels 3.

The ECU 20 outputs a command such that a required driving force to be applied to the vehicle 1 is distributed between the driving force of the left and right front wheels 2 and the driving force of the left and right rear wheels 3. The required driving force is applied to the vehicle 1 in response to a driving operation by a driver (e.g., a sensor signal from an accelerator sensor 35 indicative of an accelerator operation amount), for instance. The ECU 20 outputs a front wheel motor target torque command to the front wheel drive circuit 15, and outputs a rear wheel motor target torque command to the rear wheel drive circuit 16, to realize the driving force distribution.

The group of sensors includes, for instance, a longitudinal acceleration sensor 31, a lateral acceleration sensor 32, a yaw rate sensor 33, and wheel speed sensor 34, as sensors that detect a running state of the vehicle. The longitudinal acceleration sensor 31 detects acceleration in the longitudinal direction of the vehicle 1. The lateral acceleration sensor 32 detects acceleration in the lateral direction of the vehicle 1. The yaw rate sensor 33 detects the yaw rate of the vehicle 1. The wheel speed sensor 34 detects the wheel speed (rotation speed) of each of the left and right front wheels 2 and left and right rear wheels 3.

The group of sensors also includes an accelerator sensor 35, a steering angle sensor 36, and a brake sensor 37, as sensors that detect a driving operation by the driver. The accelerator sensor 35 detects an accelerator operation amount by the driver. The steering angle sensor 36 detects a steering wheel operation amount by the driver. The brake sensor 37 detects a brake operation amount by the driver.

The group of sensors also includes a plurality of sensors that measure correction parameter values of energy loss caused by running of the vehicle 1. These sensors include a temperature gauge 41 of the front wheel transmission 13, a temperature gauge 42 of the rear wheel transmission 14, a temperature gauge 43 of the front wheel motor 11, and a temperature gauge 44 of the rear wheel motor 12. These sensors also include a front wheel gear position sensor 45 that detects a gear position of the front wheel transmission 13, and a rear wheel gear position sensor 46 that detects a gear position of the rear wheel transmission 14.

The monitor 19a of the battery 19 monitors the state of battery 19. The monitor 19a outputs information about the state of charge (SOC) indicative of the remaining charge in the battery 19 to the ECU 20.

Figure 2:
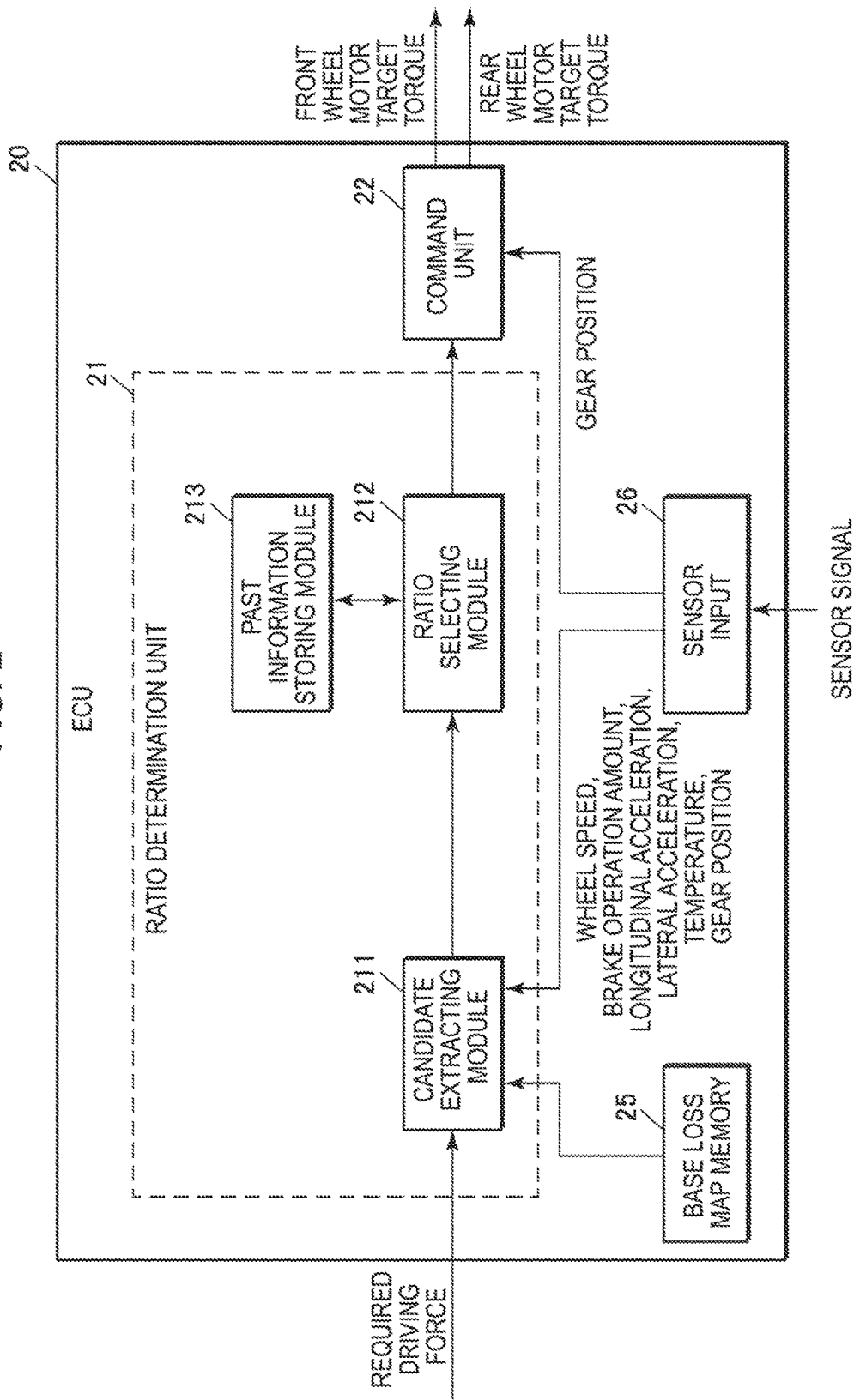
FIG. 2 is a functional block diagram illustrating the internal configuration of an ECU according to a first example.

FIG. 2 is a functional block diagram illustrating the internal configuration of the ECU according to the first example.

The ECU 20 in the first example is provided with a ratio determination unit 21, a command unit 22, a base loss map memory 25, and a sensor input 26, as illustrated in FIG. 2. The ratio determination unit 21 has a candidate extracting module 211, a ratio selecting module 212, and past information memory 213. These constituent elements illustrated in FIG. 2 may be formed by software executed by a central processing unit (CPU) of the ECU 20, or they may be formed by hardware.

The ratio determination unit 21 receives the required driving force and determines a target ratio at which to distribute the required driving force to the left and right front wheels 2 and the left and right rear wheels 3.

The command unit 22 receives the target ratio from the ratio determination unit 21, and calculates a target torque for the front wheel motor 11 and a target torque for the rear wheel motor 12 that are required to generate driving force in which the required driving force is distributed at the target ratio, in the left and right front wheels 2 and the left and right rear wheels 3. For this calculation, information about the gear positions of the front wheel transmission 13 and the rear wheel transmission 14 is used in order to know the reduction gear ratio of each power transmission path. The command unit 22 outputs the front wheel motor target torque and the rear wheel motor target torque to the front wheel drive circuit 15 and the rear wheel drive circuit 16, respectively, such that the calculated target torques are output.

The candidate extracting module 211 extracts a plurality of candidate ratios with low energy loss, on the basis of running energy loss, from all of the distribution ratios at which the required driving force can be distributed to the front wheels 2 and the rear wheels 3. The candidate extracting module 211 calculates energy loss that occurs with each distribution ratio in order to extract the candidate ratios. The calculated energy loss includes the energy losses generated in the front wheel motor 11, the rear wheel motor 12, the front wheel transmission 13, and the rear wheel transmission 14.

Also, the candidate extracting module 211 changes the width of the ratio range from which the plurality of candidate ratios are extracted in accordance with the running state. One or a plurality of parameters, such as vehicle speed, brake operation amount, longitudinal acceleration, and lateral acceleration, may be employed as a parameter indicative of the running state. These are parameters that affect the priority of driving stability or energy efficiency. For example, driving stability is given a lower priority when the vehicle speed is low, and given a higher priority when the vehicle speed is high. The same is also true for the other parameters.

The ratio selecting module 212 selects one candidate ratio with high driving stability from the plurality of extracted candidate ratios. The high driving stability is not necessarily limited to the highest driving stability, and need only be a high driving stability among a plurality of driving stabilities. For example, the driving stability may be the second or third highest driving stability. When a single candidate ratio is selected, the ratio selecting module 212 outputs, to the command unit 22, a command for a target front wheel driving force and a target rear wheel driving force to be distributed with the selected ratio as a target ratio.

The ECU 20 repeatedly controls the driving force distribution at short time intervals such as every few milliseconds, for example. The past information memory 213 stores information related to the driving force distribution ratio selected in a past distribution control process (hereinafter, this information will be referred to as "past distribution ratio") and information related to the rear wheel driving force distributed in a past distribution control process (hereinafter, this information will be referred to as "past driving force"), in order for the ratio selecting module 212 to determine the driving stability of the candidate ratios. The driving force distribution ratio and the rear wheel driving force selected in that previous distribution control process, for example, may be applied as the past distribution ratio and the past driving force. Also, a value obtained by data processing distribution ratio values of a past plurality of times may be used as the past distribution ratio. For example, a simple moving average or a load moving average of distribution ratio values of a past plurality of times may be used as the past distribution ratio. Similarly, a value obtained by data processing rear wheel driving force values of a past plurality of times may be used as the past driving force. For example, a simple moving average or a load moving average of rear wheel driving force values of a past plurality of times may be used as the past driving force. The past information memory 213 may store the driving force distribution ratios and the rear wheel driving forces selected in the processes of a past plurality of times, and the past distribution ratio and the past driving force may be calculated using the values of these driving force distribution ratios and rear wheel driving forces.

The ratio selecting module 212 determines whether the driving stability is high or low on the basis of the amount of difference between the past distribution ratio and the candidate ratio, and the amount of difference between the past driving force and the rear wheel driving force to be distributed at the candidate ratio. The ratio selecting module 212 determines the driving stability to be high when the amounts of these differences are small. The ratio selecting module 212 may also calculate the ideal driving force distribution ratio for the running state, and add the amount of difference between this ideal driving force distribution ratio and the candidate ratio to a parameter used to determine whether the driving stability is high or low. The ideal driving force distribution ratio for the running state can be calculated on the basis of the load ratio of the front wheels 2 and the rear wheels 3, the vehicle speed, the steering angle, and the gripping ability of the front wheels 2 and the rear wheels 3, for example.

The base loss map memory 25 stores a base loss map for each of the front wheel motor 11, the rear wheel motor 12, the front wheel transmission 13, and the rear wheel transmission 14. A base loss map is map data for obtaining loss from rotary torque and rotation speed. The loss in each of the front wheel motor 11 and the rear wheel motor 12 changes depending on the operating temperature. Also, the loss in each of the front wheel transmission 13 and the rear wheel transmission 14 changes in accordance with the operating temperature and the gear position. The base loss map is map data indicating each loss not including these change amounts. The actual loss can be obtained by applying a correction based on information about the operating temperature or the gear position, to the base loss map. The candidate extracting module 211 is able to read the base loss map from the base loss map memory 25.

The sensor input 26 receives sensor signals from the group of sensors (31 to 37 and 41 to 46). The sensor input 26 digitally converts the sensor signals to acquire sensor values, and then sends these sensor values to the candidate extracting module 211. The sensor input 26 also sends information about the gear position of the front wheel transmission 13 and information about the gear position of the rear wheel transmission 14 to the command unit 22.

<Driving Force Distribution Process>

FIG. 3 is a flowchart illustrating an instance of steps in a driving force distribution process in the first example executed by the ECU. FIGS. 4A, 4B, 4C and 4D are explanatory views illustrating the first to fourth stages in the flow of the driving force distribution process.

The driving force distribution process is repeatedly executed at short cycles, such as every several milliseconds, when the vehicle 1 is in a running mode. When the driving force distribution process starts, the ECU 20 first acquires the sensor values from the group of sensors (31 to 37 and 41 to 46) (step S1). Of these, the sensor value from the accelerator sensor 35, for instance, is received as the required driving force.

Next, in the ECU 20, the candidate extracting module 211 works to generate a front loss map (step S2). The candidate extracting module 211 temperature-corrects both the loss map for the front wheel motor 11 and the loss map for the front wheel transmission 13 that corresponds to the gear position, which are stored in the base loss map memory 25, and then generates a front loss map by combining these two temperature-corrected loss maps.

FIG. 5 is a graph illustrating an instance of the front loss map. The front loss map generated by the candidate extracting module 211 indicates the relationships among motor rotation speed, motor torque, and loss a1 to a6, as illustrated in FIG. 5.

Continuing on, the candidate extracting module 211 similarly generates a rear loss map (step S3).

Next, the candidate extracting module 211 prepares all driving force combinations for the distribution of the required driving force. As illustrated in FIG. 4A, a plurality of combinations in which the total of the front wheel driving force and the rear wheel driving force equals the required driving force (100 [N]) are prepared spread out over the entire range of driving forces able to be output by the front wheel motor 11 and the rear wheel motor 12. The plurality of combinations may be prepared spread out at equally spaced intervals, or they may be densely prepared in a range where driving stability and energy efficiency greatly change, and sparsely prepared in a range where driving stability and energy efficiency do not change much.

Once the plurality of driving force combinations are prepared, the candidate extracting module 211 then calculates, using the front loss map, the energy loss in the front wheel motor 11 and the front wheel transmission 13 corresponding to the driving force of the front wheels 2 (step S5). This energy loss will be referred to as "front loss". The candidate extracting module 211 calculates the front loss for each of the plurality of combinations prepared in step S4 (see row C1 in FIG. 4B).

Continuing on, the candidate extracting module 211 calculates, using the rear loss map, the energy loss in the rear wheel motor 12 and the rear wheel transmission 14 corresponding to the driving force of the rear wheels 3 (step S6). This energy loss will be referred to as "rear loss". The candidate extracting module 211 calculates the rear loss for each of the plurality of combinations prepared in step S4 (see row C2 in FIG. 4B).

Once the front loss and the rear loss are calculated, the candidate extracting module 211 searches for the combination with the smallest combined total loss (step S7). In the instance illustrated in FIG. 4B, Combination No. 5 in column C3 is obtained as the combination with the smallest total energy loss.

Next, the candidate extracting module 211 determines whether the running state is a running state in which priority is to be given to stability, on the basis of the plurality of sensor values obtained in step S1 (step S8). Here, the candidate extracting module 211 determines whether the running state is a running state in which priority is to be given to stability in accordance with whether the vehicle speed is exceeding a predetermined threshold, whether the brake operation amount is exceeding a predetermined threshold, whether the longitudinal acceleration is exceeding a predetermined threshold, and whether the lateral acceleration is exceeding a predetermined threshold, for example. Each of the thresholds is set to a value at which the likelihood of the behavior of the vehicle 1 becoming unstable is relatively high. The candidate extracting module 211 determines that stability is a priority when at least one of the vehicle speed, the brake operation amount, the longitudinal acceleration, and the lateral acceleration exceeds a threshold, and determines that stability is not a priority when none exceed the thresholds.

If the result of the determination in step S8 indicates that stability is a priority, the candidate extracting module 211 extracts driving force combination candidates from an extraction range that is relatively wide and in which the energy loss is low, from among the plurality of combinations prepared in step S4 (step S9). In the instance illustrated in FIG. 4C, the driving force combination candidates are extracted from range D1 where the energy loss ranges from the smallest loss to the smallest loss +20%, as this extraction range. In an example of the invention, the extracted plurality of combination Nos. may serve as a plurality of candidate ratios.

On the other hand, if the result of the determination in step S8 indicates that stability is not a priority, the candidate extracting module 211 extracts driving force combination candidates from an extraction range that is relatively narrow and in which the energy loss is low, from among the plurality of combinations prepared in step S4 (step S10). In the instance illustrated in FIG. 4C, the driving force combination candidates are extracted from range D2 where the energy loss ranges from the smallest loss to the smallest loss +5%, as this extraction range. In an example of the invention, the extracted plurality of combination Nos. may serve as a plurality of candidate ratios.

In the instance illustrated in FIG. 4C, one continuous range D1 (or range D2) is given as the extraction range from which the driving force combination candidates are extracted. However, the energy loss may be extremely small in a plurality of ranges that are separated. Therefore, the extraction range from which the driving force combination candidates are extracted may be made up of a plurality of ranges that are separated.

Once the driving force combination candidates are extracted in step S10, the ratio selecting module 212 then works to evaluate the degree of stability of each combination candidate (steps S11 and S12). First, the ratio selecting module 212 reads the past distribution ratio from the past information memory 213. The ratio selecting module 212 then gives a higher stability evaluation value the closer the combination No. is to the past distribution ratio (step S11).

Continuing on, the ratio selecting module 212 reads the past driving force value from the past information memory 213. Then, the ratio selecting module 212 adds stability evaluation values for the combination Nos. in which the rear wheel driving force is close to the past driving force (step S12). The stability of each combination No. is evaluated in accordance with the evaluation values obtained by this kind of process.

The method of evaluating the driving stability of each combination No. is not limited to this instance. For example, the ratio selecting module 212 may omit the process in step S12, and evaluate the driving stability of each combination No. using only the process in step S11. Also, the ratio selecting module 212 may omit the process in step S11, and evaluate the driving stability of each combination No. using only the process in step S12. Also, the driving stability may similarly be evaluated using the front wheel driving force instead of the rear wheel driving force in step S12. Moreover, the ratio selecting module 212 may also evaluate the driving stability on the basis of parameters such as the load ratio of the front wheels 2 and rear wheels 3 of the vehicle 1, the steering angle, and the road gradient.

Next, the ratio selecting module 212 selects the combination No. with the highest evaluation value as the next control target combination (step S13). The ratio selecting module 212 then outputs the selected driving force combination to the command unit 22 as the target front wheel driving force and rear wheel driving force. In an example of the invention, this selection and output of the combination No. may serve as selection and output of the target ratio.

FIG. 4D illustrates an instance of the selection process in step S13. The instance in FIG. 4D illustrates a case in which the distribution ratio of Combination No. 9 in column F0 is the same value as the past distribution ratio (e.g., the previous target ratio), and the rear wheel driving force 2000 N in column F1 is the past driving force (e.g., the previous rear wheel driving force). Furthermore, it is presumed that the candidate extracting module 211 has set the range D1 or the range D2 in FIG. 4C as the extraction range for the combination Nos. In this case, the distribution ratio becomes closer to the past distribution ratio and the driving stability evaluation value increases, the closer the combination No. is to No. 9. Further, the rear wheel driving force becomes closer to the past driving force and the addition amount of the driving stability evaluation value becomes larger, the closer the combination No. is to No. 8. As a result, if the range D1 is set as the extraction range for the combination candidates, the combination No. with the highest evaluation value is Combination No. 8 in column E1, so this combination No. is selected in step S13. Also, if the range D2 is set as the extraction range for the combination candidates, the combination No. with the highest evaluation value is Combination No. 6 in column E2, so this combination No. is selected in step S13.

The driving force combination selected in this way satisfies the required driving force corresponding to a driving operation by the driver, and also achieves both driving stability and energy efficiency at the same time. Furthermore, the driving force of this combination is distributed in such a way that enables driving stability to be improved more than energy efficiency, when running in a running state in which the need for driving stability is high, in accordance with the running state. On the other hand, the driving force of this combination is distributed in such a way that enables energy efficiency to be improved within a range that will not impede driving stability, when running in a running state in which the need for driving stability is low, in accordance with the running state.

Once the combination No. has been selected and output to the command unit 22 in step S13, the ratio selecting module 212 then stores the distribution ratio and rear wheel driving force of this combination in the past information memory 213, and ends this cycle of the driving force distribution process.

When the target driving force is sent to the command unit 22 as a result of the driving force distribution process, the command unit 22 then calculates the target torque of the front wheel motor 11 that generates the target driving force in the front wheels 2, and the target torque of the rear wheel motor 12 that generates the target driving force in the rear wheels 3. Then, the command unit 22 outputs a command to generate these target torques to the front wheel drive circuit 15 and the rear wheel drive circuit 16, respectively. As a result, in the next control cycle, the target torques will be output from the front wheel motor 11 and the rear wheel motor 12, respectively, such that the target driving forces will be output from the front wheels 2 and the rear wheels 3, respectively.

As described above, with the driving force control apparatus 100 of the vehicle 1 according to the first example, the candidate extracting module 211 first extracts driving force combination candidates such that energy loss will decrease. Next, the ratio selecting module 212 selects one combination candidate that will increase driving stability from among the combination candidates, and sets the selected combination candidate as the target ratio. Therefore, both energy efficiency and driving stability of the vehicle 1 can be achieved, and the required driving force can be distributed, all by simple control.

Also, with the driving force control apparatus 100 of the vehicle 1 according to the first example, the candidate extracting module 211 calculates the total energy loss, which is the sum of the energy losses in the front wheel motor 11, the rear wheel motor 12, the front wheel transmission 13, and the rear wheel transmission 14, as the energy loss in the vehicle 1. Therefore, the required driving force distribution ratio can be determined on the basis of accurate energy loss.

Also, with the driving force control apparatus 100 of the vehicle 1 according to the first example, the candidate extracting module 211 widens or narrows the extraction range for the driving force combination candidates in accordance with the running state. Therefore, when the running state is such that priority should be given to driving stability, the driving force control apparatus 100 is able to extract a plurality of combination candidates from a wide range and determine a driving force distribution ratio such that driving stability will increase. Also, when the running state is such that the need for driving stability is not high, the driving force control apparatus 100 is able to extract a plurality of combination candidates from a narrow range and determine a driving force distribution ratio such that energy efficiency will increase.

Also, with the driving force control apparatus 100 of the vehicle 1 according to the first example, the ratio selecting module 212 evaluates a combination candidate in which the driving force distribution ratio is close to a past distribution ratio as being a ratio that provides high driving stability. Further, the ratio selecting module 212 evaluates a combination candidate in which the rear wheel driving force is close to a past driving force as being a combination that provides high driving stability. Therefore, driving stability of the vehicle 1 is able to be improved such that the vehicle behavior will not become unstable due to a sudden change in the driving force distribution ratio or the rear wheel driving force.

Second Example

Figure 6:
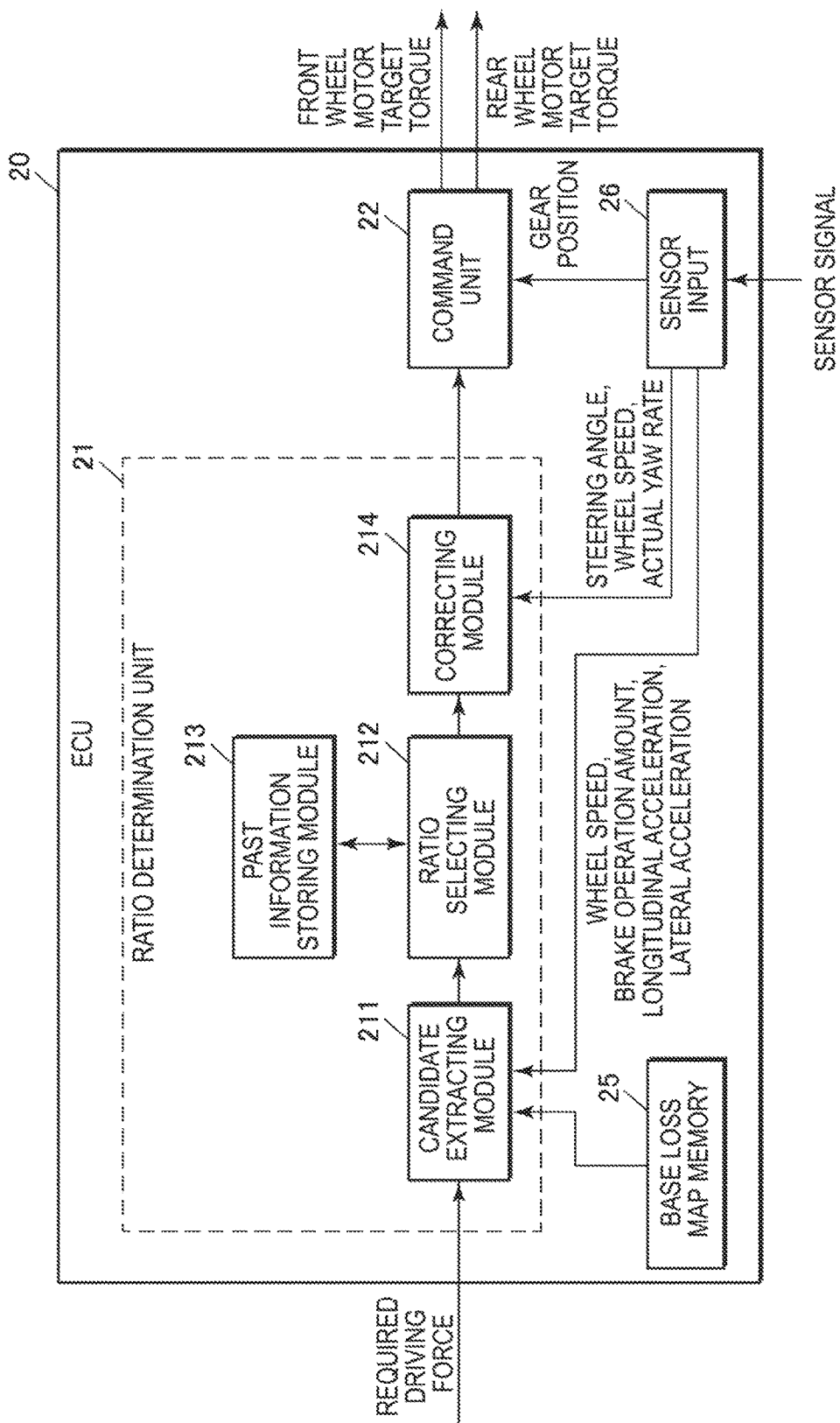
FIG. 6 is a functional block diagram illustrating the internal configuration of an ECU according to a second example.
Figure 7:
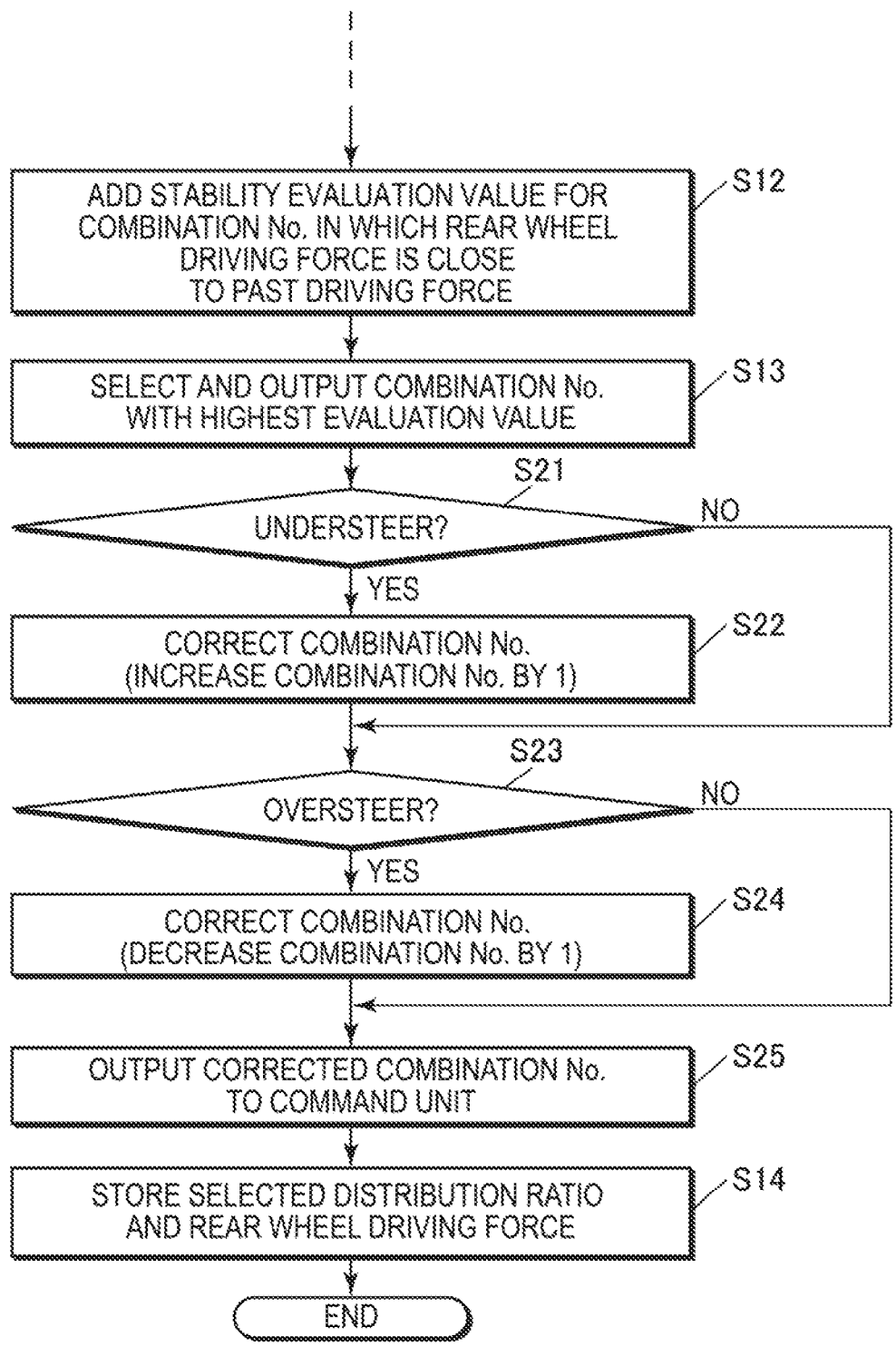
FIG. 7 is a flowchart illustrating an instance of steps in a driving force distribution process in the second example executed by the ECU.

FIG. 6 is a functional block diagram illustrating the internal configuration of an ECU according to a second example. FIG. 7 is a flowchart illustrating an instance of steps in a driving force distribution process of the second example executed by the ECU.

A portion of the driving force control apparatus 100 according to the second example differs from a portion of the driving force control apparatus 100 according to the first example. Therefore, portions that are similar to portions in the first example will be denoted by like reference numerals, and detailed descriptions of these portions will be omitted.

The driving force control apparatus 100 according to the second example is provided with a correcting module 214 between the ratio selecting module 212 and the command unit 22. In an example of the invention, the correcting module 214 may serve as a first correcting module or a second correcting module.

The correcting module 214 applies a correction to the driving force distribution ratio when there is an understeer tendency or an oversteer tendency in the vehicle 1. The correcting module 214 receives sensor values that are detection results regarding steering angle, wheel speed, and actual yaw rate, from the sensor input 26.

<Driving Force Distribution Process>

The driving force distribution process according to the second example differs from the driving force distribution process according to the first example in that the processes of steps S21 to S24 in FIG. 7 have been added.

In the driving force distribution process according to the second example, when the ratio selecting module 212 selects a combination No. in step S13, this combination No. is input to the correcting module 214, and a correction process (steps S21 to S25) is started by the correcting module 214. In this correction process, the correcting module 214 first determines whether the current running state is an understeer state, from the difference between a predicted yaw rate obtained from the vehicle speed and the steering angle, and the actual yaw rate (step S21).

If the determination result is not indicative of understeer, the correcting module 214 moves the process directly to step S23. On the other hand, if it is determined that there is understeer, the correcting module 214 performs a correction that increases the combination No. selected in step S13 by one (step S22). For example, if the ratio selecting module 212 has selected Combination No. 6 in column E2, as indicated in FIG. 4D, the correcting module 214 makes a correction to select Combination No. 7. As a result, the ratio of driving force distributed to the front wheels 2 is reduced, so the understeer tendency can be reduced.

In step S23, the correcting module 214 determines whether the current running state is an oversteer state, from the difference between the predicted yaw rate obtained from the vehicle speed and the steering angle, and the actual yaw rate (step S23).

If the determination result is not indicative of oversteer, the correcting module 214 moves the process directly to step S25. On the other hand, if it is determined that there is oversteer, the correcting module 214 performs a correction that decreases the combination No. selected in step S13 by one (step S24). For example, if the ratio selecting module 212 has selected Combination No. 6 in column E2, as indicated in FIG. 4D, the correcting module 214 makes a correction to select Combination No. 5. As a result, the ratio of driving force distributed to the rear wheels 3 is reduced, so the oversteer tendency can be reduced.

Continuing on, the correcting module 214 outputs the corrected combination No. to the command unit 22 (step S25). Moreover, the ratio selecting module 212 stores the selected distribution ratio and rear wheel driving force in the past information memory 213 (step S13). With this, one cycle of the driving force distribution process ends.

The correction of the combination No. in steps S22 and S24 may also be performed among the plurality of combination candidates extracted in step S9 or step S10. Also, if there is no applicable combination No. among the combination candidates, the correction may be omitted. Further, the content stored in the past information memory 213 in step S13 may be the distribution ratio and rear wheel driving force of a combination No. selected after a correction.

In this way, with the driving force control apparatus 100 according to the second example, the driving force combination No. is appropriately corrected in accordance with understeer or oversteer when such understeer or oversteer occurs. Therefore, this correction makes it possible to improve driving stability by reducing understeer or oversteer.

Third Example

Figure 8:
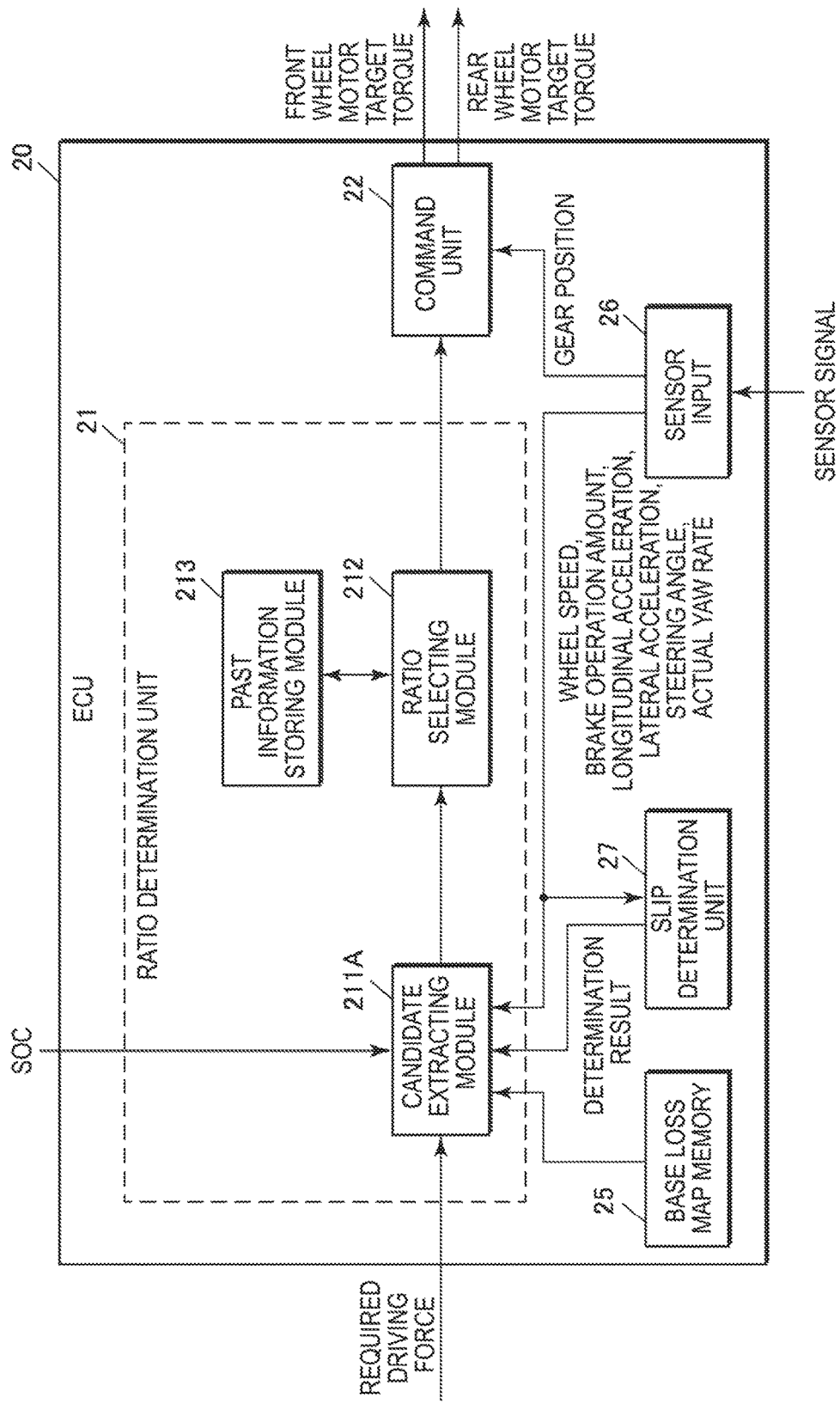
FIG. 8 is a functional block diagram illustrating the internal configuration of an ECU according to a third example.

FIG. 8 is a functional block diagram illustrating the internal configuration of an ECU according to a third example. FIG. 9 is a flowchart illustrating an instance of steps in a driving force distribution process of the third example executed by the ECU.

A portion of the driving force control apparatus 100 according to the third example differs from a portion of the driving force control apparatus 100 according to the first example. Therefore, portions that are similar to portions in the first example will be denoted by like reference numerals, and detailed descriptions of these portions will be omitted.

The ECU 20 according to the third example is provided with a slip determination unit 27, in addition to the constituent components of the first example. The ECU 20 is also provided with a candidate extracting module 211A that has additional functions, instead of the candidate extracting module 211 in the first example.

The slip determination unit 27 receives sensor values from the sensor input 26, and determines a slip ratio of the vehicle 1 on the basis of these sensor values. The slip ratio can be estimated by comparing the wheel speed of the wheels obtained from the output of the wheel speed sensors 34, with the vehicle speed obtained from time integration of the longitudinal acceleration and the lateral acceleration, for example. The slip ratio can also be estimated by comparing the wheel speed of the wheels obtained from time integration of the driving force of the wheels, with the wheel speed of the wheels obtained from the output of the wheel speed sensors 34. The slip determination unit 27 need only estimate the slip ratio of the wheels using one of these methods or any of a variety of well-known methods. The slip determination unit 27 outputs the determination result of the slip determination to the candidate extracting module 211A.

The candidate extracting module 211A receives the determination result indicating whether slip is occurring, from the slip determination unit 27. The candidate extracting module 211A also receives information about the SOC from the monitor 19a of the battery 19. In addition to the functions described in the first example, the candidate extracting module 211A also serves to widen and narrow the extraction range for the driving force combination candidates on the basis of the determination result from the slip determination unit 27 and the information about the SOC.

<Driving Force Distribution Process>

The driving force distribution process according to the third example differs from the driving force distribution process according to the first example in that the processes of steps S31 to S39 in FIG. 9 have been modified and added.

In the driving force distribution process according to the third example, when the determination as to whether the running state is a running state in which priority is to be given to driving stability has been made in step S8, the candidate extracting module 211A first sets the extraction range of the driving force combination candidates in accordance with the determination result (steps S31 and S32). For example, if driving stability is not a priority, the candidate extracting module 211A sets a relatively narrow range from the low energy loss end as the extraction range of the driving force combination candidates (see step S31 and range D2 in FIG. 4C). Also, if the running state is one in which priority is to be given to driving stability, the candidate extracting module 211A sets a relatively wide range from the low energy loss end as the extraction range of the driving force combination candidates (see step S32 and range D1 in FIG. 4C).

Next, the candidate extracting module 211A inputs the SOC (step S33), and determines whether the SOC is lower than a threshold THlow indicative of a low charging rate (step S34). If the determination result is such that the SOC is equal to or greater than the threshold THlow, the candidate extracting module 211A moves the process directly to step S36. On the other hand, if the SOC is lower than the threshold THlow, the candidate extracting module 211A resets the extraction range of the driving force combination candidates to a narrower range. For example, the candidate extracting module 211A resets the extraction range of the driving force combination candidates to a range where the energy loss is between the smallest loss and the smallest loss +3% (step S35).

Continuing on, the slip determination unit 27 determines whether slip occurs (step S36), and the candidate extracting module 211A determines whether there is slip from the detection result from the slip determination unit 27 (step S37). If the determination result is such that there is no slip, the candidate extracting module 211A moves the process directly to step S39. On the other hand, if there is slip, the candidate extracting module 211A resets the extraction range of the driving force combination candidates to a wider range. For example, the candidate extracting module 211A resets the extraction range of the driving force combination candidates to a range where the energy loss is between the smallest loss and the smallest loss +40% (step S38).

Then, the candidate extracting module 211A extracts driving force combination candidates from the set extraction range that is ultimately set (step S39).

Thereafter, the processes in steps S11 to S13 are executed, similar to the first example, and one cycle of the driving distribution process ends.

As described above, with the driving force control apparatus 100 according to the third example, when the charging rate of the battery 19 is low and energy efficiency is consequently given very high priority, only combinations in which the energy loss is very close to the smallest loss may be taken as driving force combination candidates. As a result, the ratio selecting module 212 will select a driving force combination in which the energy loss is very close to the smallest loss. Therefore, a driving force distribution in which priority is given to energy efficiency is realized.

Also, with the driving force control apparatus 100 according to the third example, when slip occurs and driving stability is consequently given very high priority, driving force combination candidates may include combinations with energy loss that is much greater than the smallest loss. Therefore, the selection range of the ratio selecting module 212 is wider, so a driving force distribution in which priority is given to energy efficiency is realized.

Also, with the driving force control apparatus 100 according to the third example, when the SOC of the battery 19 is low and it has been determined that there is slip, the determination result indicating that there is slip is given priority, and the extraction range of the driving force combination candidates is set to a wide range. Therefore, even in such a case, driving stability of the vehicle 1 is able to be prevented from becoming greatly impaired.

As described above, according to the examples of the present invention, the candidate extracting module extracts a plurality of candidate ratios such that energy loss decreases, and the ratio selecting module selects, from these, one candidate ratio such that driving stability increases, and the selected candidate ratio is made the target ratio. As a result, the required driving force is able to be distributed in a manner such that both driving stability and energy efficiency are achieved at the same time.

While each example of the present invention has been described above, the present invention is in no way limited to this example. For instance, in the example described above, the front wheel motor 11 and the rear wheel motor 12 are applied as the plurality of drive sources. However, the plurality of drive sources are not limited to motors and may also include an engine. That is, the vehicle may be an electric vehicle (EV), a hybrid vehicle (HV), a hybrid electric vehicle (HEV), or a fuel cell vehicle (FCV).

Also, the example describes an instance in which driving force is distributed between the front wheels 2 and the rear wheels 3. However, the combination of wheels among which the driving force is distributed may be changed as necessary, e.g., each of front, rear, and left and right wheels individually, or each of three groups of wheels, one group consisting of two rear wheels, another group consisting of a left front wheel, and the remaining group consisting of a right front wheel.

Also, the example gives the front wheel transmission 13 and the rear wheel transmission 14 as power transmission mechanisms, but the transmissions may be omitted. For instance, a power transmission mechanism having a constant reduction gear ratio may be provided. Also, for instance, in an electric vehicle having a gear reduction in-wheel motor in each of a plurality of wheels, the reduction gear serves as a power transmission mechanism. Further, in an electric vehicle having a direct drive in-wheel motor, a motor output shaft, a rotating shaft of a wheel, and bearings of these shafts, and the like serve as power transmission mechanisms.

Also, with the examples described above, an evaluation method based on the amount of difference between the distribution ratios of the combination candidates and the past distribution ratio, and the amount of difference between the rear wheel driving forces of the combination candidates and the past driving force is given as the method of evaluating the driving stability of each driving force combination candidate. However, the method of evaluating the driving stability of each combination candidate is not limited to this instance. For example, the ratio selecting module 212 may also evaluate driving stability by only the amount of difference between the distribution ratios of the combination candidates and the past distribution ratio. Conversely, the ratio selecting module 212 may evaluate driving stability by only the amount of difference between the rear wheel driving forces of the combination candidates and the past driving force. Also, the driving stability may be similarly evaluated by replacing the rear wheel driving force with the front wheel driving force. Moreover, the ratio selecting module 212 may also perform the driving stability evaluation using parameters indicative of the running state, such as the load ratio of the front wheels 2 and rear wheels 3 of the vehicle 1, the steering angle, and the road gradient.

Moreover, in the example described above, the combined loss of the losses in the front wheel motor 11, the rear wheel motor 12, the front wheel transmission 13, and the rear wheel transmission 14 is applied as the running energy loss. However, the running energy loss may also include loss in another part, such as loss in a drive circuit of a motor, or loss in a battery.

Also, the second and third examples are described as instances in which functions have been added to the first example, but the additional function of the second example and the additional function of the third example may also be combined. Further, the ranges of the smallest loss +3%, +5%, +20%, and +40% are given as the ranges from which the candidate extracting module 211 extracts driving force combination candidates, but these numerical values are no more than instances. Design changes may be made to the widths of these extraction ranges as necessary. Further, the plurality of functional blocks realized by a single ECU may be realized divided among a plurality of ECUs. Moreover, the details of this example may be modified as appropriate without departing from the scope of the invention.

Although the preferred examples of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. A vehicle driving force control apparatus mounted in a vehicle that runs by transmitting power from a plurality of drive sources to a plurality of wheels or a plurality of sets of wheels, the vehicle driving force control apparatus comprising:

a ratio determination unit configured to determine a target ratio at which a required driving force applied to the vehicle is to be distributed to the plurality of wheels or the plurality of sets of wheels; and a command unit configured to command the plurality of drive sources to output power such that driving force distributed in accordance with the target ratio is generated in the plurality of wheels or the plurality of sets of wheels, wherein the ratio determination unit comprises a candidate extracting module configured to extract a plurality of candidate ratios with running low energy loss from among ratios at which the required driving force is to be distributed, and a ratio selecting module configured to select one candidate ratio with a high driving stability from among the plurality of candidate ratios, the candidate extracting module changes a width of a ratio range from which the plurality of candidate ratios are extracted, on the basis of a running state of the vehicle, and the ratio determination unit makes the distribution ratio selected by the ratio selecting module the target ratio.

2. The vehicle driving force control apparatus according to claim 1, further comprising:

a plurality of power transmission mechanisms configured to transmit power from the plurality of drive sources to the plurality of wheels or the plurality of sets of wheels, wherein the candidate extracting module extracts the plurality of candidate ratios on the basis of the running energy loss comprising energy loss generated in the plurality of drive sources, and energy loss generated in the plurality of power transmission mechanisms.

3. The vehicle driving force control apparatus according to claim 1, wherein the ratio selecting module selects the one candidate ratio on the basis of a target ratio determined in a past.

4. The vehicle driving force control apparatus according to claim 1, wherein the plurality of wheels or the plurality of sets of wheels comprises front wheels and rear wheels, and the ratio selecting module selects the one candidate ratio on the basis of a driving force distributed in a past to a first set of wheels that is either one of the front wheels and the rear wheels.

5. The vehicle driving force control apparatus according to claim 1, further comprising:

a steering angle sensor configured to detect a steering angle of the vehicle;

a wheel speed sensor configured to detect a wheel speed of the vehicle; and a yaw rate sensor configured to detect an actual yaw rate of the vehicle, wherein the plurality of wheels or the plurality of sets of wheels comprises front wheels and rear wheels, the ratio determination unit comprises a first correcting module configured to decrease-correct a distribution ratio of the front wheels from a candidate ratio selected by the ratio selecting module, when detection results from the steering angle sensor, the wheel speed sensor, and the yaw rate sensor indicate understeer, and the corrected distribution ratio is made the target ratio.

6. The vehicle driving force control apparatus according to claim 1, further comprising:

a steering angle sensor configured to detect a steering angle of the vehicle;

a wheel speed sensor configured to detect a wheel speed of the vehicle; and a yaw rate sensor configured to detect an actual yaw rate of the vehicle, wherein the plurality of wheels or the plurality of sets of wheels comprises front wheels and rear wheels, the ratio determination unit comprises a second correcting module configured to increase-correct a distribution ratio of the front wheels from a candidate ratio selected by the ratio selecting module, when detection results from the steering angle sensor, the wheel speed sensor, and the yaw rate sensor indicate oversteer, and the corrected distribution ratio is made the target ratio.

7. The vehicle driving force control apparatus according to claim 1, further comprising:

a slip determination unit configured to determine whether the plurality of wheels or the plurality of sets of wheels slip, wherein the candidate extracting module makes a ratio range from which the plurality of candidate ratios are extracted wider when the slip determination unit determines that a slip occurs than when the slip determination unit does not determine that a slip occurs.

* * * * *